United States Patent Office
2,924,506
Patented Feb. 9, 1960

2,924,506

SOLVENT EXTRACTION PROCESS FOR PLUTONIUM

Herbert H. Anderson, Newton, Mass., and Larned B. Asprey, Richmond, Calif., assignors to the United States of America as represented by the United States Atomic Energy Commission No Drawing. Application May 8, 1947
Serial No. 746,870

17 Claims. (Cl. 23—14.5)

This invention relates to the separation of plutonium from an aqueous solution by solvent extraction and to the extraction of plutonium from an organic solution.

It has recently become known that various isotopes of plutonium, which is the chemical element having an atomic number of 94, can be prepared by a number of different nuclear processes. For example, it is known that plutonium can be produced in small quantities using a cyclotron for the bombardment of natural uranium with neutrons as follows:

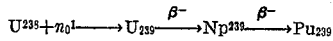

Other isotopes of plutonium are obtained by neutron bombardment of $Pu^{239}$ as follows:

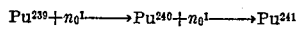

Furthermore, the plutonium isotope of mass 238, referred to as $Pu^{238}$, can be prepared by deuteron bombardment of the uranium isotope $U^{238}$, to produce $Np^{238}$ which forms $Pu^{238}$ by beta decay.

In addition to the production of plutonium by neutron bombardment of uranium using a cyclotron, neutronic reactors have been developed for the production of plutonium from natural uranium by a self-sustaining chain reaction. One of the isotopes of uranium occurring in natural uranium is $U^{235}$ which is present in the amount of 0.71% by weight. When this isotope is bombarded by slow neutrons, preferably of thermal energies, it undergoes fission and releases on an average about two neutrons per fission, in addition to the production of fission fragments of relatively low atomic weights. The main constituent of natural uranium, namely $U^{238}$, absorbs thermal neutrons to produce $Pu^{239}$ and $Pu^{240}$ by means of the reactions shown above. Both of these isotopes of plutonium can undergo fission by bombardment with slow neutrons as does $U^{235}$, and likewise they produce on an average two neutrons per neutron absorbed when fission occurs. Thus, in a natural-uranium neutronic reactor the excess neutrons that are released by fission are sufficient to maintain a production of plutonium through neutron absorption by the predominant uranium isotope $U^{238}$. However, the concentration of plutonium thus produced is generally small, rarely being above 1% by weight of the uranium and usually being substantially below this concentration; thus, it is necessary to recover plutonium from uranium masses from neutronic reactors having plutonium concentrations below one part per thousand parts and even one part per million parts of uranium.

As mentioned above, during neutron irradiation of uranium there are produced, in addition to the transuranic elements Np and Pu, other elements of lower atomic weight, known as fission fragments. These radioactive fission fragments are composed of two distinct groups of elements, namely, a light element group and a heavy element group. The light element group contains elements having atomic numbers between about 35 and 46 and the heavier element group is composed of elements having atomic numbers between about 51 and 60. The elements of both of these groups as originally produced, being considerably overmassed and undercharged, are highly unstable. By means of beta radiation they quickly transform themselves into isotopes of other elements having longer half-lives. The fission fragments and the resulting decay products are collectively known as fission products.

The various radioactive fission products have half-lives that range from a fraction of a second to thousands of years. Those having very short half-lives may be substantially eliminated by aging the neutron-irradiated material for a reasonable period of time before further processing. Those radioactive fission products having very long half-lives do not have a sufficiently intense radiation to endanger personnel protected by moderate shielding. On the other hand, the radioactive fission products that have half-lives ranging from a few days to a few years have dangerously intense radiations which cannot be eliminated by aging for practical storage periods. The fission products are chiefly the radioactive isotopes of Sr, Y, Zr, Cb, and Ru of the light group and Te, I, Cs, Ba, La, Ce, and Pr of the heavy group.

The material from the neutronic reactor contains an amount of fission products that is of about the same order of magnitude as the amount of plutonium present. In order to recover the plutonium, it is necessary to separate it from large masses of uranium and from a large number of elements having lower molecular weights.

In several of the processes that have been developed for the separation of plutonium from the fission products and from large amounts of uranium, it is customary to separate plutonium and fission products from uranium by precipitation, using a carrier. Under such conditions uranium remains in solution and the precipitate is separated from the uranium solution by suitable means, such as centrifuging, and the precipitate is then dissolved for subsequent processing to separate the plutonium from the fission products. The latter separation is accomplished by several methods such as precipitation processes and solvent extraction processes.

An object of this invention is to separate plutonium from its aqueous solution containing as impurities other salts such as the fission products produced during the production of plutonium from uranium.

A second object of this invention is to separate plutonium from its aqueous solutions containing a high concentration of acids such as nitric acid and hydrochloric acid and their salts.

Another object of this invention is to provide a method for recovering plutonium from the waste solutions obtained in the commercial preparation of plutonium from neutron-irradiated uranium.

A further object of this invention is to provide a method for separating plutonium from impurities and producing an aqueous solution of plutonium having a considerably greater plutonium concentration than the original aqueous solution.

It is also an object of this invention to provide a means for separating plutonium from its solution in the organic solvent used to extract plutonium from aqueous solutions.

Other objects of this invention will be apparent from the description which follows.

We have found that a suitable separation can be made of plutonium from aqueous solutions of plutonium and fission products by extracting plutonium from its aqueous solution, which contains a high concentration of a salting-out agent, by means of a liquid alkyl phosphate.

The extractive solvent of the present invention is a liquid alkyl phosphate substantially immiscible with water and aqueous solutions. By alkyl phosphate we mean compounds having the general formula:

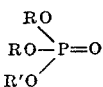

where R is a hydrogen atom or an alkyl radical and R' is an alkyl radical. The total number of carbon atoms is preferably at least 12 to provide adequate water-immiscibility. If the alkyl phosphate is a solid at room temperature, the extraction is carried out at a temperature above its melting point. Examples of suitable alkyl phosphates are tributyl phosphate, trioctyl phosphate, trihexyl phosphate, dioctyl hydrogen phosphate and octadecyl dihydrogen phosphate. Of course, mixtures of alkyl phosphates may be used as the solvent. Also, the alkyl phosphates may be in admixture with other water-immiscible organic liquids which are poor extractants where it is desirable to change the density to permit better separation of the organic extract phase and the aqueous phase.

The extraction process of the present invention uses a very water-soluble nitrate or chloride, including nitric acid and hydrochloric acid, as the salting-out agent. Other inorganic salts that are very soluble in water may be used as the salting-out agent provided the anion of the salt does not act as a complexing agent for the plutonium ion. In all cases the salting-out agent to be used must have a low solubility in the alkyl phosphate as well as a high solubility in water.

The extraction process may be carried out using a high concentration of nitric acid or hydrochloric acid, and preferably nitric acid is used. This solution may be obtained directly when a plutonium-containing precipitate is dissolved or it may be obtained by the addition of the desired amount of concentrated acid to an aqueous solution of plutonium and fission products.

When a water-soluble inorganic salt is used as the salting-out agent of the process, we prefer to use one of the following metal nitrates as the salting-out agent: $NaNO_3$, $Ca(NO_3)_2$, $KNO_3$, $Sr(NO_3)_2$, $LiNO_3$, $Mg(NO_3)_2$, $NH_4NO_3$, $La(NO_3)_3$, $Mn(NO_3)_2$, $Al(NO_3)_3$. The actual molar concentration of the inorganic salt used will depend upon the valence of the cation and the concentration of the anion desired. In general the salt concentration will be between 3 and 12 M.

Since it is desirable in many cases to use a metal salt such as a metal nitrate as the salting-out agent and since it is desirable in some cases to have a small amount of free nitric acid or hydrochloric acid present, our process may use a mixture of the inorganic acid and a water-soluble metal salt. We prefer that the metal salt, such as metal nitrate, be the predominant component of the mixture of salting-out agents. For example, when the aqueous solutions is 1 N $HNO_3$, it is desirable to employ a concentration of a univalent nitrate of at least 3 M, and preferably 5 to 10 M. Equivalent concentrations of polyvalent nitrates may be employed at the same acid concentration. With increase or decrease in acid strength the salt concentration may be accordingly decreased or increased to provide a suitable anion concentration for the salting-out of plutonium. When other water-soluble inorganic salts are used, they will be added to provide equivalent concentrations.

The aqueous solutions from which plutonium may be extracted in accordance with this invention suitably contain plutonium having a valence of at least +4 and such plutonium ions are substantially free from strong complexing agents. Thus, to adequately extract plutonium from aqueous solutions using an alkyl phosphate, no ion that will form complexes with plutonium more strongly than does the nitrate ion should be present. The hydroxyl ion and anions of acids which ionize in aqueous solution to a substantially smaller degree than does nitric acid are to be avoided. Such acids are sulfuric, phosphoric, hydrofluoric and oxalic acids. These undesirable anions can be avoided by using other materials in the prior processing steps. Alternatively, an interfering ion may itself be complexed by the addition of a suitable material. For example, the fluoride ion can be complexed by the addition of a zirconyl salt and the hydroxyl ion can be suppressed by the presence of sufficient hydrogen ions to combine with substantially all of the hydroxyl ions.

The hydroxyl ion interferes with the extraction of tetravalent plutonium, but does not interfere with the extraction of hexavalent plutonium. If the aqueous solution contains plutonium entirely in the hexavalent state, a satisfactory extraction of plutonium using a liquid alkyl phosphate may be accomplished at any hydrogen ion concentration that is sufficient to prevent the precipitation of a basic plutonium compound. Thus, an aqueous solution of plutonyl nitrate may be satisfactorily extracted by an alkyl phosphate without the aqueous solution containing free nitric acid.

Where the aqueous solution contains tetravalent plutonium, it is desirable to maintain an acid, such as nitric acid, in the aqueous solution and it is preferred that the extraction be carried out on an aqueous solution having a pH of about 2.5 or below. A preferred concentration of free nitric acid or hydrochloric acid is at least 1 N.

When inorganic salts are present in high concentrations, the amount of nitric acid required is reduced and this is especially true in the case of aqueous solutions containing hexavalent plutonium, where there is less need for free acid in the aqueous solution in order to obtain satisfactory extraction.

We have found that tributyl phosphate is a very effective solvent for extracting plutonium from aqueous solutions. For example, an aqueous solution of tetravalent plutonium containing 2 N $HNO_3$ was contacted with an equal volume of tributyl phosphate and 99% of the plutonium was extracted by tributyl phosphate. As may be seen from the following table, fission products are considerably less extracted by tributyl phosphate.

| Metal Ion Present in Aqueous Solution | Percent of Metal Ion Extracted by Tributyl Phosphate |
|---|---|
| Lanthanum | 23 |
| Cerium | 22 |
| Zirconium | 0.7 |

These extraction data are calculated for the percent extracted if equal volumes of the aqueous solution and tributyl phosphate were used. The experiments actually carried out were as follows: An aqueous solution of lanthanum nitrate containing 50 g. La/l. was contacted with twice its volume of tributyl phosphate; similarly an aqueous solution of zirconium nitrate containing 50 g. Zr/l. was contacted with twice its volume of tributyl phosphate. For cerium the aqueous solution contained 50 g. of ceric nitrate per liter and was 1 N in $HNO_3$, and 2.2 ml. tributyl phosphate was contacted with 0.85 ml. of the aqueous solution. Since the radioactive fission products are not extracted to the extent that plutonium is extracted, it is possible by use of this solvent extraction process to obtain a considerable decontamination of plutonium, i.e., to obtain plutonium having admixed with it a considerably reduced amount of compounds that have strong beta radiation.

When an aqueous solution of tetravalent plutonium containing 10 M $NH_4NO_3$ and 1 M $HNO_3$ was contacted with an equal volume of tributyl phosphate, 99% of the plutonium was extracted. In a similar experiment where the aqueous solution contained hexavalent plutonium, 97% of the plutonium was extracted by tributyl phosphate.

Aqueous solutions containing tracer amounts of tetravalent plutonium were contacted with tributyl phosphate and a satisfactory extraction was obtained. For example, a 2 N HNO₃ solution containing 1.5 mg./l. of tetravalent plutonium was contacted with an equal volume of tributyl phosphate and 99.6% of the plutonium was extracted. Tributyl phosphate extracts tetravalent plutonium from aqueous solutions in which the plutonium is present in considerably larger amounts. For example, one volume of a 2 N HNO₃ solution containing 2 g. Pu/l. was contacted with 0.2 volume of tributyl phosphate and 92.3% plutonium was extracted. Because of the poor separation of the two phases, several experiments were carried out in which the density of the tributyl phosphate was lowered by admixture with benzene, isoamyl acetate, cyclohexane, or hexane. The mechanical separation was considerably improved, but the degree of extraction was impaired, though not too severely, as may be seen from the data tabulated below.

| Aq. Soln. | | Ratio of Aq. Soln. to Org. Solvent | Org. Solvent | | Percent Pu Extracted from Aq. Soln. |
|---|---|---|---|---|---|
| Normality HNO₃ | Pu Concn. (mg./l.) | | Percent Tributyl Phosphate | Other Org. Compd. | |
| 2 | 1.5 | 0.2 | 20 | Benzene | 83 |
| 2 | 1.6 | 1 | 10 | Cyclohexane | 35 |
| 2 | 1.6 | 1 | 20 | ---do--- | 67 |
| 2 | 1.6 | 1 | 30 | ---do--- | 75 |
| 2 | 1.6 | 1 | 40 | ---do--- | 79 |
| 2 | ¹336 | 7.4 | 83 | Hexane | 92 |
| 2 | 2,000 | 1 | 20 | Isoamyl acetate | 52 |
| 2 | 2,000 | 0.1 | 10 | Cyclohexane | 61 |
| 2 | ²1,650 | 2.9 | 71 | ---do--- | 98 |

¹ Aq. soln. also contained 33.7 g.La⁺³/l. and 140 g. Al(NO₃)₃/l.
² Aq. soln. also contained 5 g. La⁺³/l. and 100 g. Al(NO₃)₃.9H₂O/l.

The present invention is especially suitable for the recovery of plutonium from waste solutions obtained during the processes for separating plutonium from uranium and from fission products. For example, in the bismuth phosphate process for separating plutonium and fission products from uranium, plutonium and the fission products are precipitated as phosphates with bismuth phosphate acting as a carrier. The precipitate-containing solution is centrifuged to separate the precipitate from the aqueous solution of uranium. Since this uranium-containing solution contains about 2% of the plutonium produced, the recovery of a substantial amount of this plutonium is worth-while. To recover this plutonium it is necessary first to remove the uranium and this can be accomplished as follows: The excess acidity of the uranium-containing waste solution is mostly neutralized by the addition of NaOH to give a solution having a pH of about 4. Then Na₂CO₃ is added to produce a solution having a pH of about 11. The fission products, plutonium, and uranium will precipitate out as a slurry. When additional Na₂CO₃ is added, it complexes and dissolves the uranium and plutonium in the slurry. The resultant solution is contacted with an adsorbent, such as silica gel containing titanium dioxide, whereby a further separation of fission products from the uranium and plutonium is effected. The uranium and plutonium are precipitated as sodium uranyl acetate and sodium plutonyl acetate by the use of acetic acid. The separated precipitate is dissolved in strong nitric acid, and a sufficient amount of a reducing agent, such as SO₂, NaNO₂ and Fe(NH₄)₂(SO₄)₂, is added to reduce the plutonium from the hexavalent state to the trivalent and tetravalent states. A salting-out agent such as Al(NO₃)₃ is added, and the uranium is extracted with ethyl ether. The raffinate is free of uranium and contains plutonium and some fission products. It is this waste solution, after oxidation of any trivalent plutonium to a valence state of at least +4, that may be treated according to the present invention for the recovery of plutonium. Other waste solutions are obtained in subsequent stages in the bismuth phosphate process, and those solutions that are not recycled as wash solutions may be mixed with the uranium-free waste solution mentioned above for recovery of the plutonium content. Similarly the waste solutions obtained by other precipitation processes for separating plutonium from uranium and fission products may be treated according to the present invention for recovery of plutonium.

Another aspect of the present invention is to provide a process for separating plutonium from an alkyl phosphate solution such as is obtained by extracting an aqueous solution of plutonium containing a salting-out agent or a mixture of salting-out agents as described above. It has been found that the plutonium present in a valence state of at least +4 in the alkyl phosphate solution may be efficiently extracted by contacting with water or with an aqueous solution of an inorganic complexing agent. It is preferable to use an aqueous solution containing an inorganic complexing agent as a more efficient extraction can be made. Examples of inorganic complexing agents are sulfuric acid, sulfates, oxalic acid, oxalates, phosphoric acid, inorganic phosphates, tartaric acid, and tartrates.

The following tabulation of data illustrates this aspect of the invention. These values were obtained by contacting a tributyl phosphate solution of tetravalent plutonium (1.2 mg. Pu/l.), in each case with an equal volume of the aqueous solution indicated. It is seen that the inorganic complexing agents greatly enhance the extraction of tetravalent plutonium from a tributyl phosphate solution.

| Aq. Soln. Used | Percent Pu Extracted by Aq. Soln. |
|---|---|
| Water | 15 |
| 1 N HCl | 25 |
| 16 N HNO₃ | 15 |
| 0.1 N HNO₃ | 13 |
| 0.2 N H₂SO₄ | 93 |
| 0.5 N H₂SO₄ | 89 |
| 1 N H₂SO₄ | 91 |
| 2 N H₂SO₄ | 73 |
| ca. 20 N H₂SO₄ | 54 |
| 0.5 M (NH₄)₂SO₄ | 95 |
| 1 M (NH₄)₂SO₄ | 92 |
| 1 N H₃PO₄ | 84 |
| ca. 20 N H₃PO₄ | 97 |
| 0.1 M Na₂HPO₄ | 49 |
| 0.05 M Ammonium oxalate | 82 |
| 0.1 M Ammonium oxalate | 89 |
| 0.1 M Ammonium tartrate | 56 |

The concentrations of inorganic complexing agents may vary widely, for example from about 0.1 N to about 20 N, since 0.05 M ammonium oxalate and 20 N H₃PO₄ were suitable.

Dilute aqueous solutions of nitric acid and hydrochloric acid can extract plutonium from an alkyl phosphate solution, but, since they act as salting-out agents even though dilute, they are not as effective as the sulfuric acid and phosphoric acid mentioned above.

If the alkyl phosphate solution of plutonium contains fission products, such as would be present in minor amounts from the alkyl phosphate extraction of an aqueous solution of plutonium and radioactive fission products, the aqueous solution containing an inorganic complexing agent will preferentially extract the plutonium thereby producing a further decontamination of the plutonium. Furthermore, by using a sufficiently small volume of an aqueous solution of an inorganic complexing agent, it is possible to produce an aqueous solution of plutonium considerably more concentrated than the aqueous solution originally extracted by the alkyl phosphate.

Another aspect of this invention is the combination of the two extraction processes described above. By this combination process a purer plutonium is obtained, and, if desired, a higher concentration of plutonium in aqueous solution can be obtained. Also, the combination process provides a suitable means for recovering plutonium from waste solutions that are obtained in processes for separating plutonium from uranium and from fission products. By carrying out several cycles of the combination process, a very high decontamination of the plutonium may be accomplished, and a more highly concentrated aqueous solution of plutonium by using successively smaller volumes of solutions may be obtained.

The present invention is not limited to such applications but may be utilized in any process where the aim is to separate plutonium from fission products or from various elements such as the isotopes of rare earths that are not radioactive.

To carry out the process of the present invention, well-known extraction procedures and apparatus may be used. The extraction steps may be effected by the use of batch, continuous batch, batch countercurrent, or continuous countercurrent methods. In general, a more efficient extraction has been obtained using the continuous countercurrent method of operation. For example, the extraction may be carried out in a packed column with the aqueous medium being introduced at an intermediate point and the alkyl phosphate being fed at the bottom of the column. The alkyl phosphate solution is drawn off at the top of the packed column. In the combination extraction process, the alkyl phosphate solution is then introduced into another packed column near the bottom of the column and the aqueous extraction medium is introduced at an intermediate point of the column. The aqueous extract is drawn off at the bottom of this column. The alkyl phosphate is drawn off the top of the second column and it may be returned to the first extraction column for re-use. Using lower-molecular-weight alkyl phosphates without diluent, the organic medium may have a higher density than water or aqueous solution containing an inorganic complexing agent. In such a case, the alkyl phosphate is drawn from the bottom of the second column and the aqueous medium from the top of the column, with their points of introduction being changed accordingly. It is preferable in both extraction columns to maintain the aqueous medium as the continuous phase and the organic medium as the dispersed phase.

The foregoing illustrations are not intended to limit the scope of this invention which is to be limited entirely by the appended claims.

We claim:

1. A process for the separation of plutonium from a substantially water-immiscible alkyl phosphate solution of plutonium in a valence state of at least +4 which comprises contacting said solution with an aqueous solution of at least one acidic complexing agent of the group consisting of sulfuric acid, phosphoric acid and oxalic acid, and separating the resultant organic phosphate phase and the aqueous extract phase.

2. The process of claim 1 in which the alkyl phosphate is a trialkyl phosphate.

3. The process of claim 1 in which the alkyl phosphate is tributyl phosphate.

4. The process of claim 1 in which the alkyl phosphate is trioctyl phosphate.

5. The process of claim 1 in which the alkyl phosphate is octadecyl dihydrogen phosphate.

6. The process of claim 1 in which the complexing agent is sulfuric acid.

7. The process of claim 1 in which the complexing agent is phosphoric acid.

8. The process of claim 1 in which the complexing agent is oxalic acid.

9. A process of separating plutonium values from fission product values contained in an aqueous solution wherein said plutonium values are in at least the tetravalent state and which also contains a nitrate-anions-containing compound as a salting-out agent, comprising contacting said solution with a substantially water-immiscible alkyl phosphate, separating a plutonium-containing alkyl phosphate phase from a fission-products-containing aqueous raffinate, contacting said alkyl phosphate phase with an aqueous solution of at least one complexing agent selected from the group consisting of sulfuric acid, phosphoric acid and oxalic acid whereby the plutonium values are complexed and back extracted into said solution of the complexing agent.

10. The process of claim 9 in which the trialkyl phosphate is tributyl phosphate.

11. The process of claim 9 in which the trialkyl phosphate is trioctyl phosphate.

12. The process of claim 9 in which the trailkyl phosphate is trihexyl phosphate.

13. The process of claim 9 in which the alkyl phosphate is dialkyl phosphate.

14. The process of claim 13 in which the dialkyl phosphate is dioctyl hydrogen phosphate.

15. The process of claim 13 in which the alkyl phosphate is monoalkyl phosphate.

16. The process of claim 15 in which the monoalkyl phosphate is octadecyl dihydrogen phosphate.

17. A process of separating plutonium (IV) nitrate from fission product nitrates contained in an aqueous nitric acid solution, comprising contacting said solution with tributyl phosphate, and separating a plutonium-containing tributyl phosphate phase from a fission-products-containing aqueous raffinate.

References Cited in the file of this patent

UNITED STATES PATENTS 2,227,833    Hixson et al.    Jan. 7, 1941
2,811,415    Seaborg    Oct. 29, 1957

OTHER REFERENCES

Smyth: "A General Account of the Development of Methods of Using Atomic Energy for Military Purposes Under the Auspices of the United States Government," page 99 (1945), U.S. Government Printing Office, Washington, D.C.